United States Patent Office 3,184,489
Patented May 18, 1965

3,184,489
11α,19,21-TRIACETOXY-14-HYDROXY-Δ$^{1,4}$-14β-PREGNADIENE-DIONE(3,20)
Christoph Tamm, Riehen, Switzerland, assignor to Sandoz Ltd. (a/k/a Sandoz A.G.), Basel, Switzerland
No Drawing. Filed July 1, 1963, Ser. No. 292,070
Claims priority, application Switzerland, July 6, 1962, 8,143/62
1 Claim. (Cl. 260—397.45)

The present invention relates to a novel steroid and to a process for the production thereof.

The present invention provides 11α,19,21-triacetoxy-14-hydroxy-Δ$^{1,4}$-14β-pregnadiene-dione (3,20) of the general formula

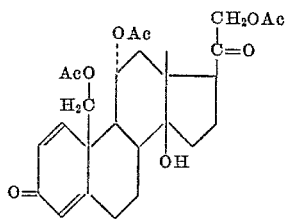

(I)

The present invention also provides a process for the production of the above compound I which comprises treating 11α,19,21-triacetoxy-5,14-dihydroxy-Δ$^1$-5β,14β-pregnenedione (3,20) of the general formula

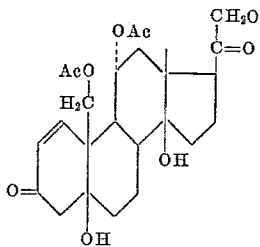

(VII)

with an organic acid, the preferred organic acid for this treatment being glacial acetic acid. Said compound VII may be produced by acetylating a Δ$^1$-3-ketone of formula

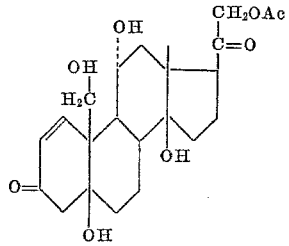

(V)

or one of formula

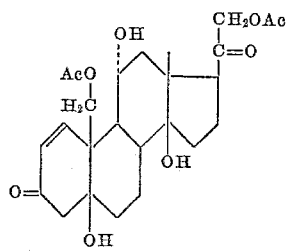

(VI)

or a mixture of these two compounds. Compounds V and VI may be obtained by the catalytic dehydrogenation of the acetates of formulae

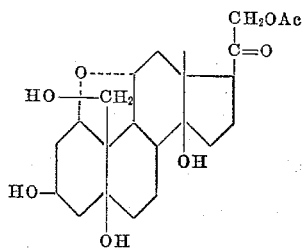

(III)

and

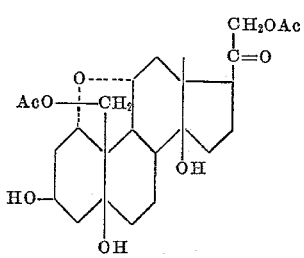

(IV)

respectively. The compounds III and IV may be obtained by acetylating the ketol of formula

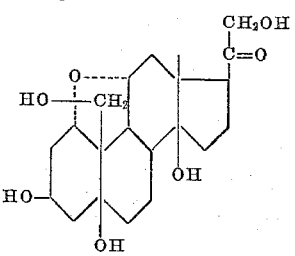

(II)

The compound I has a structure which is characteristic for numerous therapeutically important corticosteroids; it has mineralo-corticoid and gluco-corticoid properties. For example, a Δ$^{1,4}$-3-keto-structure of the A-ring is characteristic for the prednisolone series. It is also useful as an intermediate product for the production of chemotherapeutically valuable cortisone-like analogues.

The starting material 3β,5,14,19,21-penthydroxy-1α,11α-oxido-5β,14β-pregnanone (20) II may be produced by ozonolytic degradation of 3,19,-di-O-acetyl-1α,11α-oxido-strophanthidol and subsequent saponification.

The compound I may be obtained in one method of carrying out the process of the invention by treating the ketol II with 1.5 mol of acetic anhydride in a pyridine dioxane mixture at 0° C. A mixture of about equal amounts of the mono- and diacetates of Formulae III and IV is obtained; this mixture also contains a small amount of a triacetate of formula

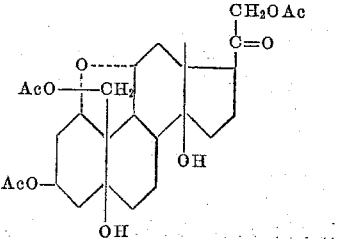

(VIII)

which can be separated by chromatography on silica gel using G.R. Duncan's method. The mixture of monoacetate III and diacetate IV is then dehydrogenated as such, preferably in aqueous acetone solution with a platinum catalyst in an atmosphere of oxygen, whereupon the corresponding $\Delta^1$-3-ketones of Formulae V and VI are formed. These are acetylated by a method known per se, whereupon the triacetyl derivative VII is formed from both substances. By heating the latter under reflux with glacial acetic acid the 5-hydroxy radical is split off and a double bond introduced in the 4-position to give the crude compound I which is purified on a silica gel column to produce the steroid I in homogeneous and crystalline form.

The compounds I may be used as a therapeutic agent, e.g. in the form of a pharmaceutical preparation. Such a preparation contains the compound I in admixture with an organic or inorganic carrier which is suitable for enteral, parenteral or local application. The following substances are suitable carriers:—gelatine, lactose, starch, magnesium stearate, talc, vegetable oils, benzyl alcohols, gum arabic, polyalkylene glycols, petroleum jelly or cholesterol. The pharmaceutical preparations may be, for example, in the form of tablets, dragées, powders, creams, suppositories, or in liquid form, e.g. solutions, suspensions or emulsions. They may be sterilized and/or contain auxiliary substances such as preservatives, stabilizers, wetting agents or emulsifiers. They may also contain further substances of therapeutical value.

The solvent ratios in the following example are by volume.

In the following example, all temperatures are quoted in degrees centigrade. Melting points are corrected.

EXAMPLE (a) *Acetylation of $3\beta,5,14,19,21$-pentahydroxy-$1\alpha,11\alpha$-oxido-$5\beta,14\beta$-pregnanone-$(20)$ (II)*

0.025 ml. of acetic anhydride (=1.5 mols) are added to a solution of 59 mg. of pure $3\beta,5,14,19,21$-pentahydroxy-$1\alpha,11\alpha$-oxido-$5\beta,14\beta$-pregnanone-$(20)$ of M.P. 201–202° in 1.0 ml. of dioxane and 0.5 ml. of absolute pyridine and left to stand for 20 hours at 0°. The volume is then reduced in a vacuum and the residue evaporated twice more with acetone. 64 mg. of crude product are obtained which gives 3 flecks on the thin-layer chromatogram. It is chromatographed on 75 g. of slicia gel, together with 9 mg. of analogous material from another experiment (making a total of 73 mg.). Methylene chloride/methanol (9:1) is used for elution (100 ml. fractions). Fraction 1 yields 3 mg. of triacetate VIII. Fraction 2 yields 29 mg. of amorphous material which is homogeneous in thin-layer chromatographic behaviour, diacetate IV, IR-spectrum in $CH_2Cl_2$: bands at $2.9\mu$ (OH); $5.75\mu$ (C=O, acetyl) and inflexion at $5.80\mu$ (C=O, 20-ketone). Fraction 3 provides 29 mg. of amorphous material which is homogeneous in thin-layer chromatographic behaviour (a single homogeneous fleck), monoacetate III, IR-spectrum in $CH_2Cl_2$: bands at $2.95\mu$ (OH) (very strong); $5.72\mu$ (C=O, acetyl), $5.28\mu$ (C=O, 20 ketone).

(b) *Partial catalytic dehydrogenation of the diacetate IV*

A solution of 28 mg. of the diacetate IV in 10 ml. of acetone and 7.5 ml. of water is added to a suspension of freshly prepared Pt (from 17.5 mg. of $PtO_2$) in 2.5 ml. of water and shaken for 30 hours in an $O_2$-atmosphere. After filtering and evaporating 30 mg. of crude product are obtained, which is then chromatographed on 30 g. of silica gel. Methylene chloride/methanol (95:5) is used for elution (10 ml. fractions). Fractions 1–6 give only traces of the desired material. Fractions 7–13 give 20.5 mg. of amorphous material, which proves to be a mixture in the thin-layer chromatogram (containing VI). Fractions 14–21 yield 13 mg. of amorphous material which shows only one fleck in the thin-layer chromatogram (visible in UV), the $\Delta^1$-3-ketone (VI).

IR spectra in $CH_2Cl_2$: bands at $2.78\mu$ and $2.88\mu$ (OH); $5.74\mu$ (C=O, acetyl), inflexion at $5.80\mu$ (C=O, 20-ketone) and $5.94\mu$ (C=O, $\Delta^1$-3-ketone).

(c) *Partial catalytic dehydrogenation of the monoacetate III*

A solution of 28 mg. of the monoacetate III is treated with $O_2$–Pt, exactly as described above, and the crude product (29 mg.) chromatographed on 30 g. of silica gel in a similar manner. 14 mg. of $\Delta^1$-3-ketone V are obtained.

(d) *$11\alpha,19,21$-triacetoxy-$5,14$-dihydroxy-$\Delta^1$-$5\beta,14\beta$-pregnenedione $(3,20)$*

The fractions containing the $\Delta^1$-3-ketones VI and V are left to stand for 18 hours at 37° with 3 ml. of pyridine and 3 ml. of acetic anhydride. After reducing in volume of evaporation in a vacuum, and dissolving in chloroform, the solution is washed twice each with 2 N HCl, 2 N $Na_2CO_3$ and water, dried over $Na_2SO_4$ and reduced in volume by evaporation. 43 mg. of the resulting crude product are chromatographed on 35 g. of silica gel. Methylene chloride/methanol (97:3) (10 ml. fractions) is used for elution. Fractions 1–7 wielded 22 mg. of crude VII, showing a secondary spot in the thin layer chromatogram. Fractions 8–16 yielded 23 mg. of amorphous VII which is homogeneous in thin-layer chromatographic behaviour.. $[\alpha]_D^{23}=+60°+3°$ (c.=0.830 in chloroform). UV-spectrum in ethanol:$\lambda_{max}=231$ m$\mu$ (log $\epsilon=4.00$; calculated for $C_{27}H_{36}O_{10}$). IR-spectrum in $CH_2Cl_2$: bands at $2.80\mu$ and $2.95\mu$ (OH); $5.76\mu$ (C=O, acetyl), inflexion at $5.82\mu$ (C=O, 20-ketone); $5.96\mu$ (C=O, $\Delta^1$-3-ketone); $6.24\mu$ (C=C, $\Delta^1$-3-ketone) and $8.20\mu$ (C—O=C, acetate).

(e) *Production of $11\alpha,19,21$ - triacetoxy-$5,14$-dihydroxy-$\Delta^1$-$5\beta,14\beta$-pregnanedione $(3,20)$ from the mixture of the monoacetate III and diacetate IV*

0.10 ml. of acetic anhydride (=2.2 mols) are added to a solution of 192 mg. of $3\beta,5,14,19,21$-pentahydroxy-$1\alpha,11\alpha$-oxido-$5\beta,14\beta$-pregnanone-$(20)$ in 2 ml. of dioxane and 1 ml. of pyridine at 0° and left to stand at 0° for 18 hours. The crude product (190 mg.) resulting after working up in the manner described under (a) is chromatographed on 10 g. of $Al_2O_3$. 10 ml. of solvent are used per fraction for elution. The fractions eluted with methylene chloride, containing 2–30% of methanol yield 80 mg. of crude product, consisting mainly of III and IV. A solution of 130 mg. of such a mixture in 40 ml. of acetone and 30 ml. of water is added to a suspension of platinum, freshly prepared by hydrogenation of 65 mg. of $PtO_2$, in 10 ml. of water and shaken for 15 hours at 22° in an $O_2$-atmosphere. After filtering off the catalyst and reducing the volume of the solution by evaporation, 124 mg. of crude product are obtained, which is then chromatographed on 6 g. of $Al_2O_3$. 10 ml. of solvent are used per fraction. The fractions eluted with methylene chloride which contains 1% of methanol, yield 79 mg. of crude product, consisting of a mixture of V and VI. It shows an absorption maximum at 233m$\mu$ in the UV-spectrum; (log $\epsilon=3.89$ in ethanol), which is typical for the $\Delta^1$-3-ketone group. 65 mg. of the crude product are left to stand for 18 hours at 22° with 1 ml. of pyridine and 1 ml. of acetic anhydride. The solution is chromatographed as such on 7 g. of $Al_2O_3$. 10 ml. of solvent are used per fraction. The fractions eluted with pure methylene chloride yield 41 mg. of crude VII. It shows bands in the IR-spectrum ($CH_2Cl_2$) at $2.85\mu$ and $2.95\mu$ (OH); $5.75\mu$ (C=O, acetyl); $5.95\mu$ (C=O, $\Delta^1$-3-ketone) and $6.20\mu$ (C=C, $\Delta^1$-3-ketone).

For further purification, 35 mg. of crude VII are chromatographed once more on 1 g. of $Al_2O_3$. 3.5 ml. of solvent are used per fraction for elution. The fractions eluted with pure methylene chloride and with methylene chloride which contains 0.5% of methanol, yielded 25 mg. of pure VII.

(f) *11α,19,21-triacetoxy-14-hydroxy-Δ¹,⁴-14β-pregnadiene-dione (3,20) from VII*

25 mg. of pure 11α,19,21-triacetoxy-5,14-dihydroxy-Δ¹-5β,14β-pregnenedione (3,20) VII are boiled under reflux for 30 minutes with 1.5 ml. of glacial acetic acid and subsequently evaporated to dryness in a vacuum. The residue yields 15 mg. of crude crystals from methanol/ether. The residues from the mother-liquor are chromatographed on 16 g. of silica gel. Methylene chloride/methanol (98:2) is used for elution (in 10 ml. fractions). Fractions 4 and 5 yield a further 3 mg. of crude crystals. After recrystallization from methanol, pure I is obtained as rodlets, having a double melting point of 121–124°/211–215°. After recrystallization from acetone/ether, rodlets of M.P. 210–216° are obtained. $[\alpha]_D^{25} = +64° +2°$ (c.=0.943 in chloroform). UV-spectrum in ethanol: maxima at 241 mμ (log ε=4.26) and 320 mμ (log ε=1.67). IR-spectrum (solid in KBr): bands at 2.89μ (OH); 5.70–5.74μ (C=O, acetyl); 5.80μ (C=O, 20-ketone); 5.99μ (C=O, Δ¹,⁴-3-ketone); 6.14μ and 6.21μ (C=C, Δ¹,⁴-3-ketone) and at 8.11μ (C—O=C, acetate).

Having thus disclosed the invention what is claimed is:

11α,19,21 - triacetoxy-14-hydroxy-Δ¹,⁴-14β-pregnadienedione (3,20) having the formula

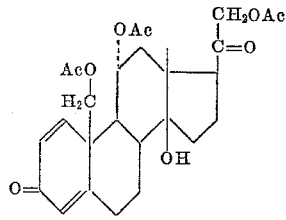

References Cited by the Examiner

Tamm et al.: "Helv. Chim. Acta," February 1963, page 238.

LEWIS GOTTS, *Primary Examiner.*